(12) United States Patent
Braun

(10) Patent No.: US 8,159,330 B2
(45) Date of Patent: Apr. 17, 2012

(54) SYSTEM AND METHOD FOR DIMENSIONAL RATING USING RFID TECHNOLOGY

(75) Inventor: John F. Braun, Fairfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 1183 days.

(21) Appl. No.: 11/942,752

(22) Filed: Nov. 20, 2007

(65) Prior Publication Data

US 2009/0128293 A1 May 21, 2009

(51) Int. Cl.
*H04Q 5/22* (2006.01)
(52) U.S. Cl. .......... 340/10.1; 340/572.1; 340/572.8; 340/686.1; 702/158; 702/159; 705/335
(58) Field of Classification Search .......... 340/10.1, 340/572.1, 572.5, 572.7, 572.8, 539.1, 539.12, 340/539.13, 539.21, 539.23, 524, 686.1; 702/128, 150, 155–159; 705/335
See application file for complete search history.

(56) References Cited

U.S. PATENT DOCUMENTS

| | | | |
|---|---|---|---|
| 4,929,843 A | 5/1990 | Chmielewski, Jr. et al. | |
| 5,042,015 A * | 8/1991 | Stringer | 367/99 |
| 5,121,328 A | 6/1992 | Sakai et al. | |
| 5,422,861 A * | 6/1995 | Stringer et al. | 367/99 |
| 5,606,534 A * | 2/1997 | Stringer et al. | 367/128 |
| 5,734,476 A | 3/1998 | Dlugos | |
| 5,770,864 A | 6/1998 | Dlugos | |
| 5,793,652 A | 8/1998 | DeBarber et al. | |
| 5,808,912 A | 9/1998 | Dlugos et al. | |
| 5,815,274 A | 9/1998 | Dlugos | |
| 5,841,541 A | 11/1998 | Dlugos | |
| 5,878,379 A | 3/1999 | Dlugos et al. | |
| 5,914,463 A | 6/1999 | Dlugos | |
| 6,008,727 A * | 12/1999 | Want et al. | 340/572.1 |
| 6,342,830 B1 * | 1/2002 | Want et al. | 340/10.1 |
| 7,222,785 B2 * | 5/2007 | Murofushi et al. | 235/383 |
| 7,262,792 B2 * | 8/2007 | Shniberg et al. | 348/169 |
| 2005/0225427 A1 * | 10/2005 | Bell et al. | 340/5.2 |
| 2006/0112023 A1 | 5/2006 | Horhann et al. | |
| 2008/0246614 A1 * | 10/2008 | Paananen | 340/572.7 |

* cited by examiner

*Primary Examiner* — Daniel Wu
*Assistant Examiner* — Nay Tun
(74) *Attorney, Agent, or Firm* — Brian A. Lemm; Charles R. Malandra, Jr.; Steven J. Shapiro

(57) ABSTRACT

A device for determining the dimensions of a parcel includes a platform and two adjacent walls. Each of the platform and walls are provided with a respective antenna for transmitting and receiving RF energy. The parcel to be measured is placed on the platform and registered against the walls. A responding device, having RFID tags attached thereto, is placed on a corner of the parcel. Each of the antennae are energized, and response signals from the RFID tags are measured. Based on the response signals from the RFID tags, the dimensions of the parcel can be determined, and the parcel can be rated for delivery based on the determined dimensions.

12 Claims, 5 Drawing Sheets

SYSTEM AND METHOD FOR DIMENSIONAL RATING USING RFID TECHNOLOGY

FIELD OF THE INVENTION

The present invention relates generally to the concept of dimensional rating to determine the charge required by a carrier for delivery of a parcel, and more particularly to a dimensional rating system that utilizes radio frequency identification (RFID) technology to determine the dimensions of a parcel.

BACKGROUND OF THE INVENTION

Various postal services and private delivery services (referred to herein collectively as "carriers") throughout the world have developed rating systems which are used to determine the fee associated with the delivery of a particular item, e.g., package, envelopes, or the like, hereinafter collectively referred to as a parcel. Generally, conventional rating systems utilize a variety of different parameters or factors which influence the fee structure, such as: weight of the parcel, desired class of service (as examples, first class or third class in the United States), and destination of the parcel. Some carriers use rating systems that also utilize the dimensions of a parcel, e.g., length, width, and thickness (or height), in determining the fee for delivery of a parcel. Rating of a parcel based on the dimensions of the parcel is commonly referred to as dimensional rating. The carriers generally communicate the rating systems in the form of tables or charts, which are updated periodically to reflect new pricing or changes in the rating parameters.

SUMMARY OF THE INVENTION

The present invention provides a system and method that allows dimensional rating utilizing RFID technology to determine the dimensions of a parcel.

In accordance with embodiments of the present invention, a device is provided that has a platform and two adjacent walls. Each of the platform and walls are provided with a respective antenna for transmitting and receiving RF energy. The parcel to be measured is placed on the platform and registered against the walls. A responding device, having RFID tags attached thereto, is placed on a corner of the parcel. Each of the antennae are energized, and response signals from the RFID tags are measured. Based on the response signals from the RFID tags, the dimensions of the parcel can be determined, and the parcel can be rated for delivery based on the determined dimensions.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate a presently preferred embodiment of the invention, and together with the general description given above and the detailed description given below, serve to explain the principles of the invention.

As shown throughout the drawings, like reference numerals designate like or corresponding parts.

DETAILED DESCRIPTION OF THE PRESENT INVENTION

Figure 1:
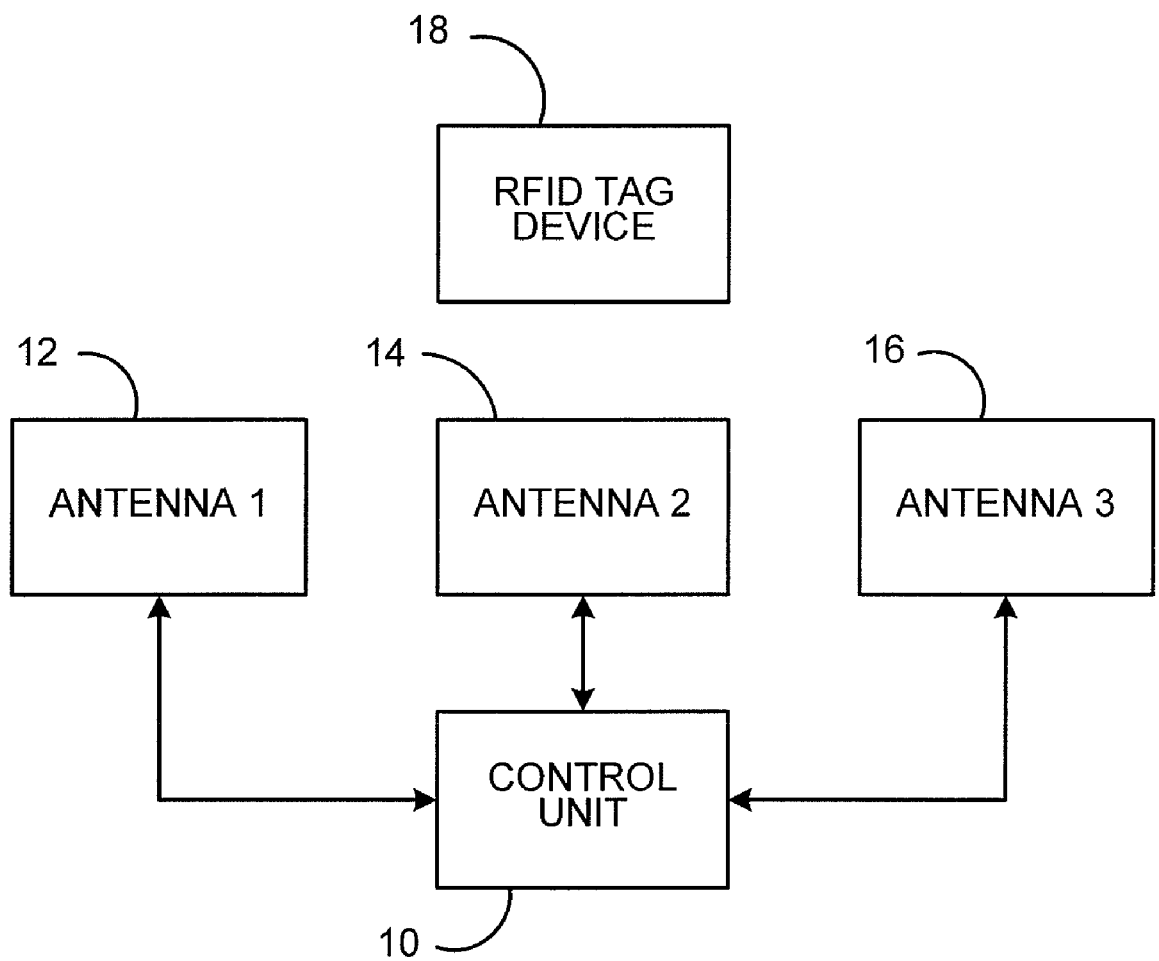
FIG. 1 illustrates in block diagram form an embodiment of the present invention.

In describing the present invention, reference is made to the drawings, wherein there is seen in FIG. 1 in block diagram form a system for determining the dimensions of a parcel according to an embodiment of the present invention. A control unit 10 is coupled to a plurality of antennae 12, 14, 16. The control unit 10 includes a processing unit (not shown), such as, for example, a microprocessor, special purpose ASIC or the like, that, utilizing software stored in a memory (not shown) controls operation of the system. The control unit 10 also includes a transmitter/receiver device (not shown) that transmits and receives radio frequency energy using the antennae 12, 14, 16. An RFID tag device 18, described further below, it utilized to receive the RF transmissions from the antennae 12, 14, 18 and to provide a responsive signal to the antennae 12, 14, 8 as described below.

Figure 2:
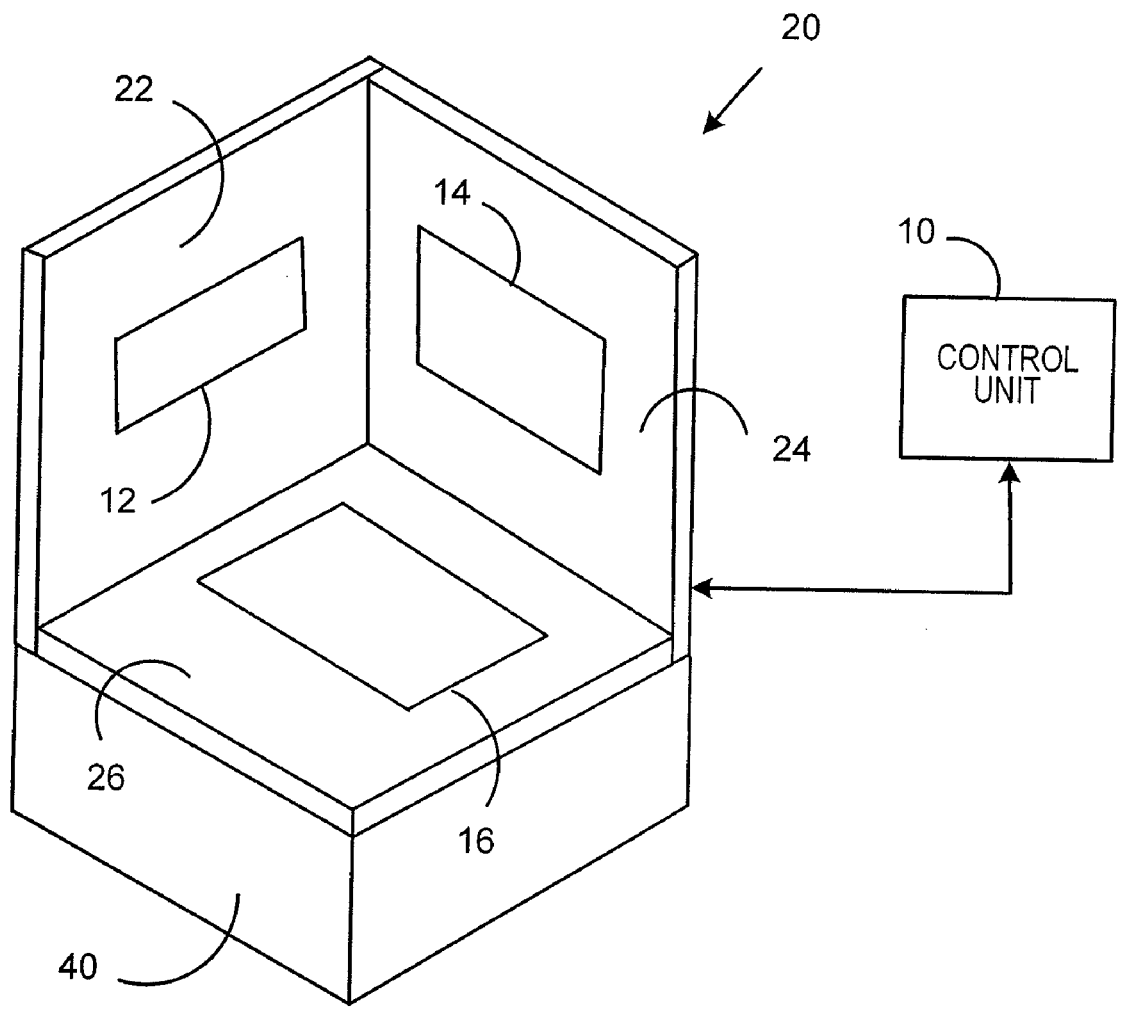
FIG. 2 illustrates a measuring device according to an embodiment of the present invention.

FIG. 2 illustrates a positioning device 20 for measuring the dimensions of a parcel. Positioning device 20 includes a first wall 22, a second wall 24 that abuts one side of wall 22, and a platform 26 abutting both walls 22 and 24. Platform 26 can optionally be the surface of a load cell for a weighing scale 40 capable of calculating the weight of parcel (not shown in FIG. 2) placed thereupon. The walls 22, 24 and platform 26 are preferable formed of a non-conducting material, such as, for example, a polymeric material. Each of the walls 22, 24 and the platform 26 is provided with a respective antenna 12, 14, 16 that, as described above with respect to FIG. 1, are coupled to the control unit 10 and are used to transmit and receive RF energy. Optionally, the control unit 10 and platform 26 could be integrated into a single unit such that the platform 26 is on top of the control unit 10.

Figure 3:
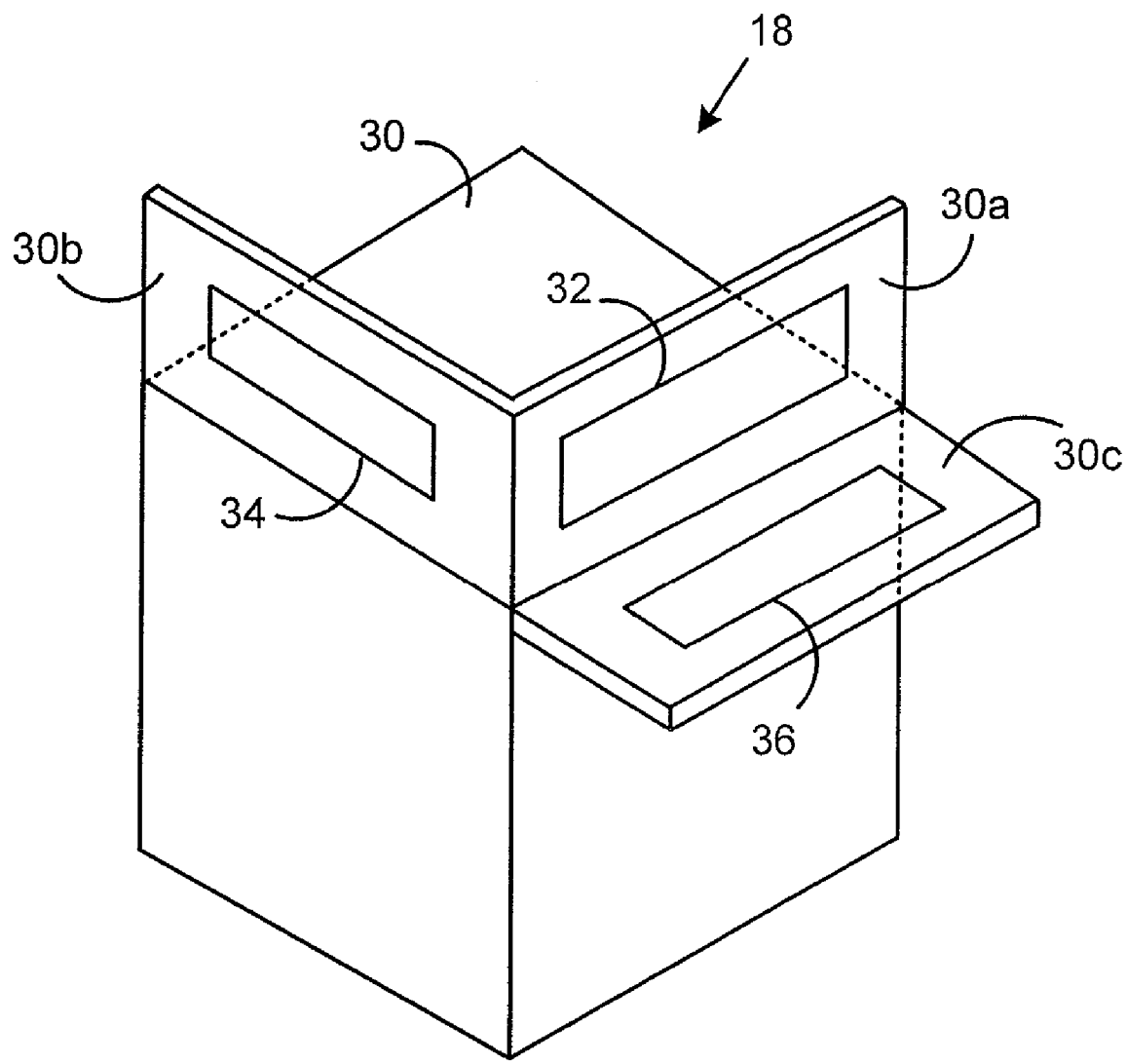
FIG. 3 illustrates an RFID tag response device according to an embodiment of the present invention.

FIG. 3 illustrates an RFID tag response device 18 according to an embodiment of the invention. The device 18 includes a holder 30 that has three mounting tabs 30a, 30b and 30c that each preferably extend from the edge of a respective side of the holder 30. The holder 30 is designed such that it can be placed on the corner of a parcel, such that each of the tabs 30a, 30b, 30c will extend outward from the parcel. Each of the mounting tabs 30a, 30b, and 30c is located such that when the holder 30 is placed on the corner of a parcel, each mounting tab 30a, 30b, 30c will be parallel to one of the antennae 12, 14, 16 and perpendicular to the others. Each of the mounting tabs 30a, 30b, 30c is provided with a respective RFID tag 32, 34, 36.

Figure 4:
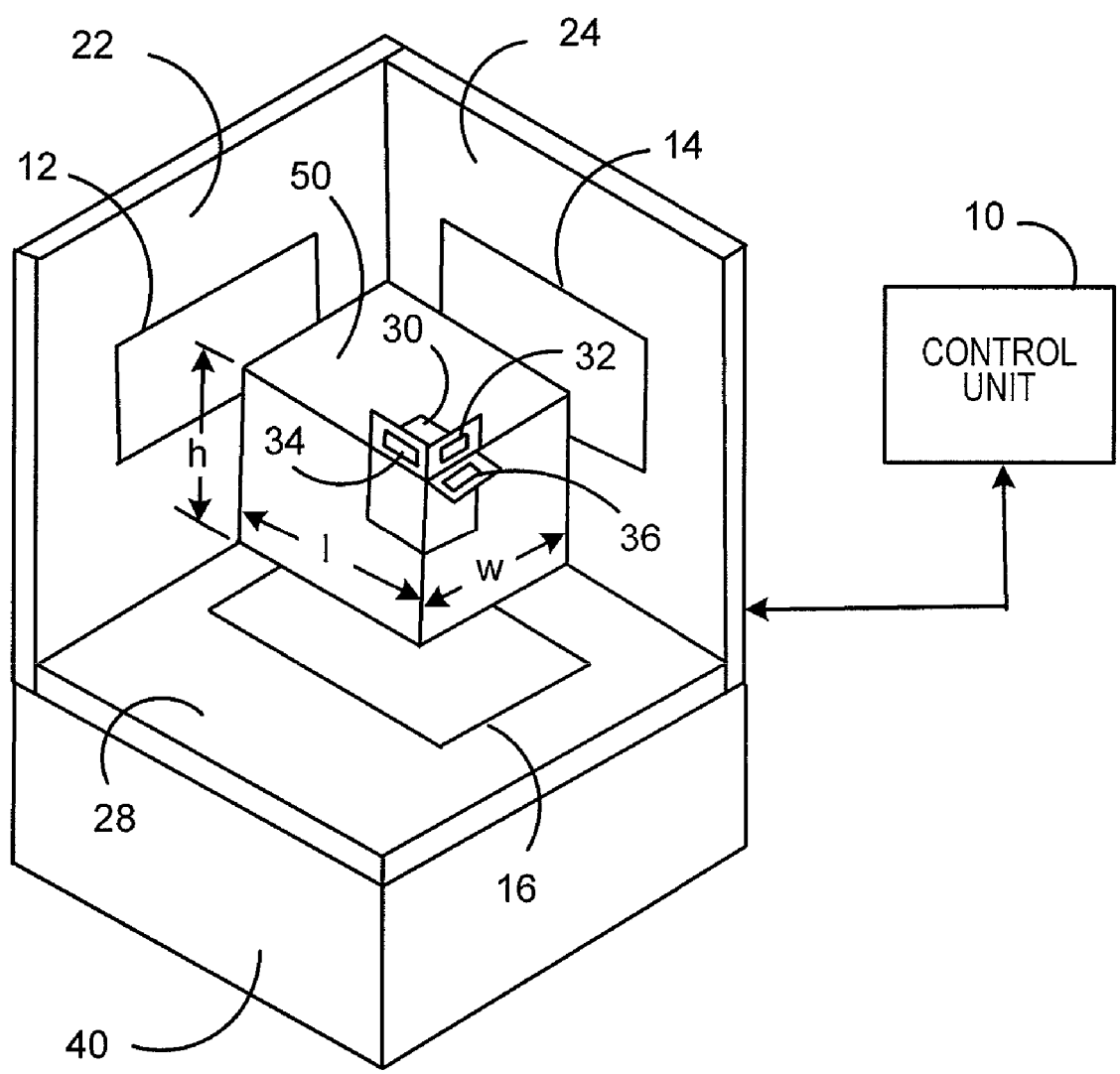
FIG. 4 illustrates a parcel being measured according to an embodiment of the present invention.

FIG. 4 illustrates a parcel 50 positioned such that the length, width and height dimensions can be measured using the system of the present invention. Parcel 50 is placed on the platform 26 and against each of the walls 22, 24 as illustrated. The device 18 is placed on an outermost corner of the parcel 50, i.e., the corner of the parcel 50 that is opposite the corner that is common to platform 26 and walls 22, 24. Because each of the mounting tabs 30a, 30b, 30c preferably extend from the edges of the holder 30, the parcel 50 does not obstruct the path between each of the RFID tags 32, 34, 36 and a respective antenna 12, 14, 16. In addition, each RFID tag 32, 34, 36 is located at substantially the same distance from one of the platform 26 or walls 22, 24 as an outer edge of a respective dimension for the parcel 50. When the device 18 is properly placed on the corner of the parcel 50, each of the RFID tags 32, 34, 36 is positioned parallel to one of the antennae 12, 14, 16 and perpendicular to the other two antennae. For example, as illustrated in FIG. 4, RFID tag 32 is located adjacent to the point furthest from the wall 22 as parcel 50 extends, is parallel to antenna 12, and perpendicular to antennae 14, 16. RFID tag 34 is located adjacent to the point furthest from the wall 24 as parcel 50 extends, is parallel to antenna 14, and perpendicular to antennae 12, 16. RFID tag 36 is located adjacent to the point highest from the platform 26 as parcel 50 extends, is parallel to antenna 16, and perpendicular to antennae 12, 14. Due to the nature of radio frequency energy, an RFID tag that is parallel to the RF field propagated by an antenna will return the RF energy, while an RFID tag that is perpendicular to the RF field propagated by an antenna will return little or no RF energy. As described below, by determining the distance between each of the RFID tags 32, 34, 36 and its respective parallel antenna 12, 14, 16 when the device 18 is properly situated on the parcel 50 (based on the response of the RFID tags 32, 34, 36), the length (l), width (w) and height (h) of the parcel 50 can be determined.

Figure 5:
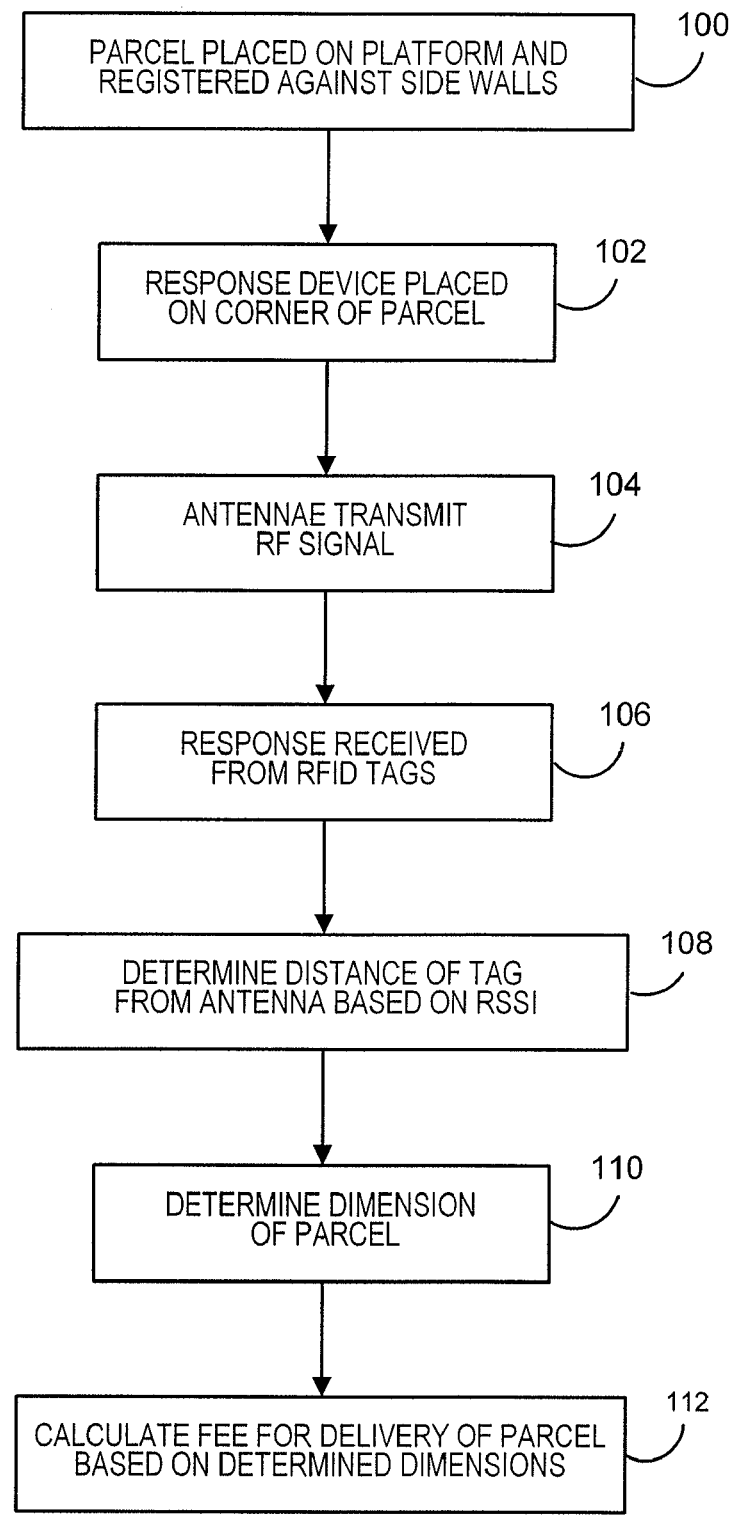
FIG. 5 illustrates in flow diagram form a process for determining the dimensions of a parcel.

FIG. 5 illustrates in flow diagram form the processing performed to determine the dimensions of a parcel 50. In step 100, a parcel 50 is placed on the platform 26 and registered against the side walls 22, 24 as illustrated in FIG. 4. Optionally, if the platform 26 is part of a weighing scale 40, the actual weight of the parcel 50 can be determined by the scale 40. In step 102, the response device 18 is placed on the corner of the parcel 50 opposite the corner that is common to platform 26 and walls 22, 24. In step 104, the control unit 10 causes each antenna 12, 14, 16 to transmit a suitable RF signal by energizing each antenna, such as, for example, 4 Watts for 900 MHz operation. Such transmission is preferably performed individually in succession. Alternatively, such transmission could be performed simultaneously. The respective RF signals, when received by the respective RFID tags 32, 34, 36, will energize the RFID tags 32, 34, 36 and cause them to provide an RF signal in response. The response RF signal could either be a reflected response (in the case of passive or semi-active RFID tags) or a transmitted response (in the case of active RID tags). The energizing in step 104 can be performed with a gradual increase in power until a response signal is received. In step 106, the responses from the RFID tags 32, 34, 36 will be detected by a respective antenna 12, 14, 16. As noted above, due to the nature of radio frequency energy, an RFID tag that is parallel to the RF field propagated by an antenna will return the RF energy, while an RFID tag that is perpendicular to the RF field propagated by an antenna will return little or no RF energy. Thus, only RFID tag 32 will return the RF signal from antenna 12, only RFID tag 34 will return the RF signal from antenna 14, and only RFID tag 36 will return the RF signal from antenna 16.

The strength of the return signal (also referred to as the Receive Signal Strength Indication (RSSI), measured in decibels relative to one milliwatt (dBm)) from each of the RFID tags 32, 34, 36 is related to the distance of the RFID tags 32, 34, 35 from the respective antenna 12, 14, 16. The closer the RFID tag is to the antenna, the stronger the signal will be. In step 108, the control unit 10, using the RSSI from each of the RFID tags 32, 34, 36, can determine the distance that each of the RFID tags 32, 34, 36 is located from the respective antenna 12, 14, 16. This determination can be performed, for example, using a reference table stored in a memory of the control unit 10. The reference table will map various RSSI values to a distance between the RFID tag and antenna. The reference table can be previously generated utilizing empirical methods, and will be based on specifics of the RFID tags 32, 34, 36, the antennae 12, 14, 16, and the receiver in the control unit 10.

In step 110, the control unit 10 will utilize the distances determined in step 108 to determine the dimensions of the parcel 50. As illustrated in FIG. 4, the distance between the RFID tag 32 and antenna 12 corresponds to the length (l) of the parcel 50, the distance between the RFID tag 34 and antenna 14 corresponds to the width (w) of the parcel 50, and the distance between the RFID tag 36 and antenna 16 corresponds to the height (h) of the parcel 50. In step 112, control unit 10 can determine the carrier fee for shipment of the parcel 50 based on the dimensions of the parcel 50 as determined in step 110 (and optionally the actual weight of the parcel 50) using one or more rate tables stored within a memory of the control unit 10.

It should be noted that while the above description was directed to obtaining all three dimensions (length, width and height) of a parcel, the invention is not so limited and can be used to obtain only a single dimension. For example, the positioning device need only include a base and a single antenna. The response device need only include a single RFID tag which can be placed on a parcel to obtain only a single dimension. The parcel can then be rotated and the response device repositioned to obtain a second dimension, and the parcel rotated again and the response device repositioned to obtain the third dimension.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

What is claimed is:

1. A system for determining dimensions of a parcel comprising:
   a positioning device for holding the parcel, the positioning device including a platform, a first side wall and a second side wall adjacent the first side wall, each of the platform, the first side wall and the second side wall including a respective antenna for transmitting and receiving RF signals;
   a response device adapted to be placed on the parcel, the response device including a plurality of mounting tabs that extend from the response device, a first RFID tag being provided on a first mounting tab and being located such that it is a similar distance from the platform as the parcel extends, a second RFID tag being provided on a second mounting tab and being located such that it is a similar distance from the first side wall as the parcel extends, and a third RFID tag being provided on a third mounting tab and being located such that it is a similar distance from the second side wall as the parcel extends, wherein when the response device is placed on the parcel, the parcel does not obstruct a path between the first RFID tag and the platform, the second RFID tag and the first side wall, and the third RFID tag and the second side wall; and
   a control device coupled to each antenna, the control device causing each of the antennas to transmit a respective RF signal, the respective RF signal causing at least one of the RFID tags to provide a response signal, the control unit determining the dimensions of the parcel based on the response signals returned from the RFID tags.

2. The system of claim 1, wherein the response device is adapted to be placed on a corner of the parcel.

3. The system of claim 1, wherein the first RFID tag is located such that it is substantially parallel to the platform, the second RFID tag is located such that it is parallel to the first side wall, and the third RFID tag is located such that it is parallel to the second side wall.

4. The system of claim 1, wherein the control device determines the dimensions of the parcel based on strength of the response signals returned from the RFID tags and a reference table that correlates strength of signal to a distance between an antenna and an RFID tag.

5. The system of claim 1, wherein the control unit causes each of the antennas to transmit a respective RF signal in succession.

6. The system of claim 1, wherein the control unit causes each of the antennas to transmit a respective RF signal simultaneously.

7. The system of claim 1, wherein the control unit causes each of the antennas to transmit a respective RF signal in increasing power levels until an RFID tag responds.

8. A method for determining dimensions of a parcel comprising:
   placing the parcel in a positioning device having a platform, a first side wall and a second side wall adjacent the first side wall, each of the platform, the first side wall and the second side wall including a respective antenna for transmitting and receiving RF signals;
   placing a response device on an outermost corner of the parcel, the response device including a plurality of mounting tabs that extend from the response device, a first RFID tag being provided on a first mounting tab and being located such that it is a similar distance from the platform as the parcel extends, a second RFID tag being provided on a second mounting tab and being located such that it is a similar distance from the first side wall as the parcel extends, and a third RFID tag being provided on a third mounting tab and being located such that it is a similar distance from the second side wall as the parcel extends, wherein when the response device is placed on the parcel, the parcel does not obstruct a path between the first RFID tag and the platform, the second RFID tag and the first side wall, and the third RFID tag and the second side wall;
   energizing each of the respective antennas such that each antenna transmits a respective RF signal, each of the respective RF signal causing at least one of the first, second and third RFID tags to provide a response signal;
   receiving the response signal from each of the first, second and third RFID tags, a strength of each response signal being based on a distance between a respective RFID tag and parallel antenna; and
   determining the dimensions of the parcel based on the strength of each of the response signals received from the first, second and third RFID tags.

9. The method of claim 8, wherein energizing each of the respective antennas further comprises:
   energizing each of the respective antennas in succession.

10. The method of claim 8, wherein energizing each of the respective antennas further comprises:
    energizing each of the respective antennas simultaneously.

11. The method of claim 8, wherein energizing each of the respective antennas further comprises:
    energizing each of the respective antennas in increasing power levels until an RFID tag responds.

12. The method of claim 8, further comprising:
    calculating a carrier fee for delivery of the parcel based at least in part on the dimensions of the parcel.

* * * * *